INVENTOR.
THOMAS KLEIN
BY
[signature]
AGENT 3,363,760

METHOD OF MAKING A DOUBLE DIFFUSED SEMICONDUCTOR DEVICE BY A DOUBLE MASKING STEP

Thomas Klein, Horley, England, assignor to North American Philips Company, Inc., New York, N.Y., a corporation of Delaware Continuation of application Ser. No. 417,116, Dec. 9, 1964. This application May 15, 1967, Ser. No. 638,662
Claims priority, application Great Britain, Dec. 13, 1963, 49,356/63
3 Claims. (Cl. 148—187)

ABSTRACT OF THE DISCLOSURE

A method of making a double diffused semi-conductor device in which a second thinner masking layer is used to close the window in a first thicker masking layer through which a first diffused zone was formed. Afterwards, both masking layers are subjected to a common removal treatment over an area which overlaps the boundary of the first window, with the result that a second window is formed which coincides with the boundary of the first window. Through the second window are diffused impurities forming a second diffused zone. An advantage of the method is that the lateral boundaries of the first and second zones are spaced apart by a distance substantially equal to the difference beween their depths of penetration.

This application is a continuation of a prior copending application, Ser. No. 417,116, filed Dec. 9, 1964.

The invention relates to a method of providing diffused zones in a semiconductor body, in which an oxide resist masking layer is applied to the semiconductor body, in which layer a window is made through which an impurity is diffused into the semiconductor body in order to obtain a first diffused zone, after which the window in the oxide layer is closed by a second oxide masking layer in which a smaller window than that of the first oxide layer is made, through which smaller window an impurity is diffused into the semiconductor body in order to obtain a second diffused zone located in the first diffused zone.

In such methods it is often desirable for a second diffused zone to be obtained which approaches, at least in one direction, the lateral boundary of the first zone very closely. This may be desirable when the first zone constitutes the base zone of a transistor, while the second zone is the emitter zone which must cover a maximum portion of the base zone, considering the fact that a space must be left for providing one or more base contacts. Such an emitter zone may extend for example in the form of a strip on the base zone, while the ends of the strip are located near the lateral boundary of the base zone and at the side of the strip a base contact can be provided on the base zone.

With known methods of the kind set forth, in which a second diffused zone has to be provided which approaches closely, at least in one direction, the lateral boundary of the first zone, the windows in the oxide layers must be provided with utmost care, only small tolerances in the said direction being permissible. Therefore, such methods can be carried out only with difficulty and take much time.

The invention has for its object inter alia to simplify such methods to a considerable extent by providing a method in which the said close tolerances can be observed in a particularly simple manner.

In accordance with the invention a method of the kind set forth is characterized in that a second oxide layer is applied which is thinner than the first layer and in that a window is provided in said second oxide layer extending at least in one direction up to the edge of the window in the first oxide layer by etching both oxide layers over a surface comprising the window to be made and overlapping the first oxide layer in the said direction.

Since the second oxide layer is thinner than the first oxide layer, the first oxide layer will be locally etched away only over part of its thickness when a window is made in the thin oxide layer, so that the masking effect for the second diffusion treatment is maintained. Moreover, the window obtained in the thin oxide layer extends, at least in one direction, precisely up to the edge of the window in the first oxide layer, so that in this direction the distance between the lateral boundaries of the two diffused zones obtained is determined by the difference in distances over which the impurities diffuse into the semiconductor body during the two diffusion treatments.

An important embodiment of the method according to the invention is characterized in that diffused zones are provided in a semiconductor body of one conductivity type and a first diffused zone of the other conductivity type is obtained by diffusion of an impurity of said other conductivity type and a second zone of the one conductivity type by diffusion of an impurity of the same type.

The invention furthermore relates to a semiconductor device manufactured by carrying out the method according to the invention.

One embodiment of the method according to the invention for the manufacture of a transistor will now be described with reference to the drawing.

Figure 1:
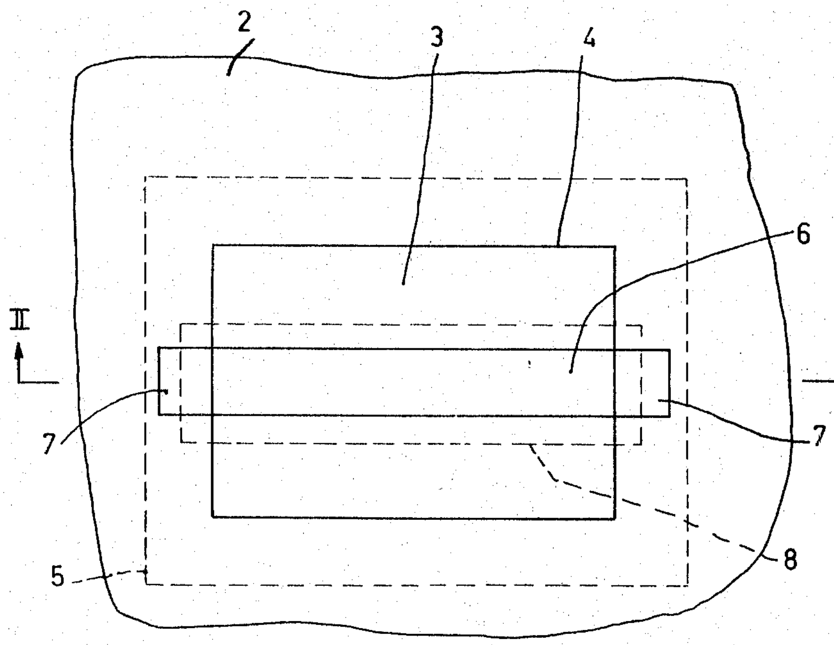
FIG. 1 shows diagrammatically a plan view of a transistor.
Figure 2:
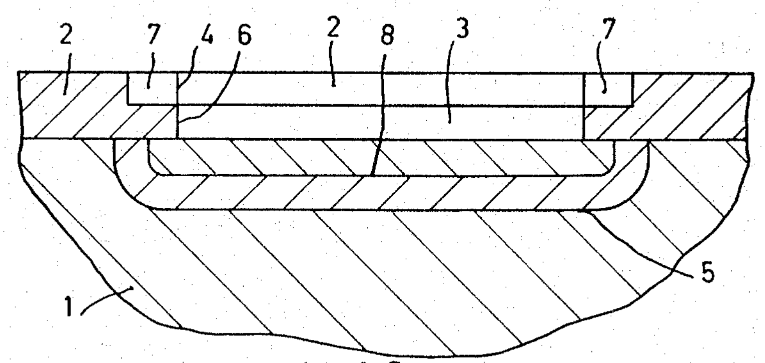
FIG. 2 shows diagrammatically a cross-sectional view of said transistor taken on the line II—II in FIG. 1.

In both figures the semiconductor body of the transistor is shown only partly.

A first oxide layer 2 is grown on an n-type die 1 of phosphorus-doped silicon having a resistivity of 5 ohm-cm. and a thickness of 0.25 mm. by heating the die in an atmosphere of wet oxygen saturated with water vapour at 98° C. for 16 hours at 1000° C.

The oxide layer 2 is removed from the die 1 over the desired surface in order to form a rectangular window 4. The selective removal of the oxide layer is carried out, as usual, by using a photo-resist layer and etching.

Boron is diffused into the die through the window 4 by heating the die at 1000° C. for 20 minutes in a furance in which boron nitride is heated at 1000° C., the vapour obtained being passed over the die by means of a flow of nitrogen. The thickness of the p-type zone 5 thus obtained is $1\mu$ and the surface concentration of boron is about $1 \times 10^{19}$ atoms/cc.

The exposed surface of the die 1 and the surface of the oxide layer 2 thereon are cleaned by boiling the die in concentrated nitric acid for 15 minutes and by washing the die in distilled, deionized water. A second oxide layer is applied in the window 4 by heating the die in an atmosphere of wet oxygen at 1000° C. for 6 hours. During this treatment a thinner, second oxide layer 3 is obtained on the surface in the window and the remaining portion of the first oxide layer 2 is made slightly thicker.

A second strip-shaped window 6 is made in the oxide layer 3 by using a photo-resist layer and by etching. Also the parts 7 of the first oxide layer 2 are etched. The portion 6 of the second oxide layer 3 is removed and at the same time the parts 7, which are adjacent the portion 6, are only made thinner.

Phosphorus is diffused into the die 1 through the window 6 by heating the die at 1100° C. for 10 minutes in an oven in which phosphorus nitride is heated at 1000° C., the vapour obtained being passed over the die by means of a flow of nitrogen. The penetration depth of the n-type zone 8 thus obtained is 0.5$\mu$ and the surface concentration of phosphorus is $5\times10^{20}$ atoms/cc.

Phosphorus does not diffuse into the die 1 through the second oxide layer 3 neither through the first oxide layer 2, since even the etched portions of the first oxide layer (see portions 7) have still sufficient, thickness for serving as a mask in the diffusion treatment.

The surface of the die and the surfaces of the oxide layers thereon are cleaned in the manner described above.

Then the die may be processed further by grinding and etching and contacts may be applied to the first diffused zone 5, the second diffused zone 8 and the non-processed portion of the die 1, after which, if desired, the body may be encapsulated and a transistor is obtained.

In the method described above it should be considered that during the diffusion the penetration in the die extends also transversely from the boundaries of the windows over a distance which is substantially equal to the penetration depth.

It will be obvious that the difference between the distances over which the boron and the phosphorus are diffused beneath the layer 2 i.e. the lateral distance between the zones 5 and 8 is determined from substantially the same boundaries of the windows 4 and 6 in the longitudinal direction of the strip-shaped window 6.

What is claimed is:

1. A method of making a double-diffused semi-conductor device, comprising the steps of providing on a surface of a semiconductor body a first masking layer having a given thickness, forming a first window in said first masking layer, diffusing active impurities through the first window into the underlying semiconductor body to form a first diffused zone therein, closing the first window by providing a second masking layer on the semiconductor body throughout its surface exposed by the first window, said second masking layer having a smaller thickness than the given thickness of said first masking layer, subjecting said first and second masking layers to a simultaneous material removal treatment over an area that, in at least one direction, overlaps the boundary of the first window until the thinner second masking layer is removed and terminating before the thicker first masking layer is removed whereby a second window is formed whose boundary in said one direction coincides with the boundary of said first window, and diffusing active impurities through the second window to form a second diffused zone within and spaced from the interior boundaries of the first diffused zone, whereby the lateral spacing of the boundaries of the two diffused zones is substantially equal to the difference between their penetration depths.

2. A method as set forth in claim 1 wherein the first and second masking layers are oxide layers of substantially the same composition, and the material removal treatment is an etching treatment.

3. A method as set forth in claim 1 wherein the active impurities diffused through the first window form a first diffused zone of a conductivity type opposite to that of the original body, and the active impurities diffused through the second window form a second diffused zone of a conductivity type the same as that of the original body.

References Cited

UNITED STATES PATENTS

| | | | |
|---|---|---|---|
| 3,064,167 | 11/1962 | Hoerni | 148—187 X |
| 3,226,611 | 12/1965 | Haenichen. | |
| 3,281,915 | 11/1966 | Schramm. | |
| 3,287,188 | 11/1966 | Moles | 148—187 |

HYLAND BIZOT, *Primary Examiner.*